(12) United States Patent
Xue et al.

(10) Patent No.: US 10,437,519 B2
(45) Date of Patent: Oct. 8, 2019

(54) METHOD AND MOBILE TERMINAL FOR PROCESSING WRITE REQUEST

(71) Applicant: HUAWEI TECHNOLOGIES CO., LTD., Shenzhen, Guangdong (CN)

(72) Inventors: Chun Xue, Shenzhen (CN); Liang Shi, Chongqing (CN); Congming Gao, Chongqing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/992,516

(22) Filed: May 30, 2018

(65) Prior Publication Data

US 2018/0275925 A1 Sep. 27, 2018

Related U.S. Application Data

(63) Continuation of application No. PCT/CN2016/106959, filed on Nov. 23, 2016.

(30) Foreign Application Priority Data

Nov. 30, 2015 (CN) .......................... 2015 1 0856803

(51) Int. Cl.
*G06F 3/00* (2006.01)
*G06F 3/06* (2006.01)
(Continued)

(52) U.S. Cl.
CPC .............. *G06F 3/0659* (2013.01); *G06F 3/06* (2013.01); *G06F 3/061* (2013.01); *G06F 3/0679* (2013.01); *G06F 12/0246* (2013.01); *H04W 8/02* (2013.01)

(58) Field of Classification Search
None
See application file for complete search history.

(56) References Cited

U.S. PATENT DOCUMENTS 8,347,302 B1 * 1/2013 Vincent ................. G06F 9/4881
718/103
2005/0044289 A1 2/2005 Hendel et al.
(Continued)

FOREIGN PATENT DOCUMENTS

CN 1648878 A 8/2005
CN 101218566 A 7/2008
(Continued)

OTHER PUBLICATIONS

Grupp, Laura M. et al, "The Harey Tortoise: Managing Heterogeneous Write Performance in SSDs," 2013 USENIX Annual Technical Conference (USENIX ATC '13), USENIX Association, pp. 79-90.
(Continued)

*Primary Examiner* — Henry Tsai
*Assistant Examiner* — Dean Phan
(74) *Attorney, Agent, or Firm* — Fish & Richardson P.C.

(57) ABSTRACT

A method for processing a write request is disclosed, the method includes: determining, by an IO scheduler, that current IO scheduling is in a blocked state; selecting, by the IO scheduler, a target synchronous write request from to-be-processed IO requests; adding, by the IO scheduler, an acceleration flag to the target synchronous write request, where the acceleration flag is used to instruct a flash memory controller to perform acceleration processing on the target synchronous write request by using idle space of a flash memory; after the flash memory controller receives, from the IO scheduler, the target synchronous write request, determining, by the flash memory controller, a size of the idle space of the flash memory; and when the size of the idle space of the flash memory is greater than a threshold, performing, by the flash memory controller, acceleration processing on the target synchronous write request.

12 Claims, 3 Drawing Sheets

(51) Int. Cl.
*H04W 8/02* (2009.01)
*G06F 12/02* (2006.01)

(56) References Cited

U.S. PATENT DOCUMENTS

| | | |
|---|---|---|
| 2006/0253645 A1 | 11/2006 | Lasser |
| 2008/0195803 A1 | 8/2008 | Park et al. |
| 2010/0082879 A1 | 4/2010 | McKean et al. |
| 2011/0078696 A1 | 3/2011 | Blackburn et al. |
| 2012/0066447 A1 | 3/2012 | Colgrove et al. |
| 2013/0031443 A1 | 1/2013 | Oh et al. |
| 2015/0199137 A1 | 7/2015 | Shin et al. |
| 2015/0301854 A1* | 10/2015 | Park .................. G06F 9/4881 718/102 |

FOREIGN PATENT DOCUMENTS

| | | |
|---|---|---|
| CN | 101382927 A | 3/2009 |
| CN | 102129353 A | 7/2011 |
| CN | 103135945 A | 6/2013 |
| CN | 103593271 A | 2/2014 |
| CN | 104881248 A | 9/2015 |
| CN | 105511806 A | 4/2016 |
| KR | 20050020942 A | 3/2005 |
| KR | 20080075608 A | 8/2008 |
| KR | 20110035853 A | 4/2011 |
| KR | 20130013574 A | 2/2013 |

OTHER PUBLICATIONS

International Search Report, dated Feb. 16, 2017, in International Application No. PCT/CN2016/106959 (5 pp.).
Search Report, dated Dec. 12, 2017, in Chinese Application No. 2015108568031 (2 pp.).
Office Action, dated Dec. 25, 2017, in Chinese Application No. 201510856803.1 (3 pp.).
International Search Report dated Feb. 16, 2017 in corresponding International Patent Application No. PCT/CN2016/106959.
Extended European Search Report, dated Oct. 10, 2018, in European Application No. 16869906.4 (8 pp.).
PCT International Preliminary Report on Patentability in International Application PCT/KR10-2018-7017980, dated Jun. 19, 2019, 15 pages (With English translation).

* cited by examiner

ME THOD AND MOBILE TERMINAL FOR PROCESSING WRITE REQUEST

CROSS-REFERENCE TO RELATED APPLICATIONS

This application is a continuation of International Application No. PCT/CN2016/106959, filed on Nov. 23, 2016, which claims priority to Chinese Patent Application No. 201510856803.1, filed on Nov. 30, 2015. The disclosures of the aforementioned applications are hereby incorporated by reference in their entireties.

TECHNICAL FIELD

Embodiments of this application relate to the field of mobile terminals, and in particular, to a method and mobile terminal for processing a write request.

BACKGROUND

In recent years, mobile terminals have become indispensable electronic products in people's life. An operating system of a mobile terminal may be considered as a hierarchical structure including a series of software and hardware. For example, in an Android (Android) operating system, a hierarchical structure for data management and maintenance includes a database management system, a file system, a block device driver, and an underlying storage device from top to bottom. The block device driver mainly uses an input/output (IO) scheduler to schedule an IO request. The underlying storage device is usually a storage device based on a flash memory. For example, the underlying storage device may be an embedded multimedia card (eMMC) storage device. The eMMC storage device includes a flash memory chip and an eMMC controller that controls the flash memory chip to perform a read operation.

When the file system of the mobile terminal reads data from and writes data into the underlying storage device, the IO scheduler generates a corresponding IO request. The IO request includes a synchronous request and an asynchronous request. When the IO scheduler processes a synchronous request, a confirmation value can be returned to the system only after all data of the request is written into the storage device or read from the storage device. At that time, the synchronous request is completely executed. If a processing time of a synchronous request is excessively long or there are excessive to-be-processed synchronous requests, that is, when IO scheduling is blocked, problems such as system stalling and performance degradation occur in the mobile terminal, affecting user experience.

SUMMARY

Embodiments of this application disclose a method and mobile terminal for processing a write request, to reduce a possibility of system stalling in the mobile terminal.

According to a first aspect, a method for processing a write request is provided, where the method includes: determining, by an input/output IO scheduler in a mobile terminal, that current IO scheduling is in a blocked state, where the blocked state includes a state in which a time of processing an IO request by the IO scheduler is greater than a first preset threshold; selecting, by the IO scheduler, a target synchronous write request from to-be-processed IO requests, where the target synchronous write request is used to write data into a flash memory of the mobile terminal; adding, by the IO scheduler, an acceleration flag to the target synchronous write request, where the acceleration flag is used to instruct a flash memory controller to perform acceleration processing on the target synchronous write request by using idle space of the flash memory; after the flash memory controller receives, from the IO scheduler, the target synchronous write request including the acceleration flag, determining, by the flash memory controller, a size of the idle space of the flash memory; and when the size of the idle space of the flash memory is greater than a second preset threshold, performing, by the flash memory controller, acceleration processing on the target synchronous write request by using the idle space of the flash memory.

With reference to the first aspect, in a first possible implementation of the first aspect, the method further includes: the selecting, by the IO scheduler, a target synchronous write request from to-be-processed IO requests includes: selecting, by the IO scheduler, a foremost synchronous write request from an IO request queue; and determining, by the IO scheduler, that the foremost synchronous write request is the target synchronous write request.

With reference to the first aspect or the first possible implementation of the first aspect, in a second possible implementation of the first aspect, the method further includes: the determining, by an IO scheduler in a mobile terminal, that current IO scheduling is in a blocked state includes: determining, by the IO scheduler, a quantity of the to-be-processed IO requests in the IO request queue; and when the quantity of the to-be-processed IO requests is greater than a first threshold, determining, by the IO scheduler, that the current IO scheduling is in the blocked state.

With reference to the first aspect or the first possible implementation of the first aspect, in a third possible implementation of the first aspect, the method further includes: the determining, by an IO scheduler in a mobile terminal, that current IO scheduling is in a blocked state includes: determining, by the IO scheduler, a processing time of a write request or read request that is currently being processed; and when the processing time is greater than a second threshold, determining, by the IO scheduler, that the current IO scheduling is in the blocked state.

With reference to any one of the first aspect or the first to the third possible implementations of the first aspect, in a fourth possible implementation of the first aspect, the performing, by the flash memory controller, acceleration processing on the target synchronous write request includes: allocating, by the flash memory controller, a fast programming page for the target synchronous write request; and performing, by the flash memory controller, acceleration processing on the target synchronous write request by using the fast programming page.

With reference to the fourth possible implementation of the first aspect, in a fifth possible implementation of the first aspect, the method further includes: after the flash memory controller performs acceleration processing on the target synchronous write request by using the idle space of the flash memory, determining the size of the idle space of the flash memory; and when the size of the idle space of the flash memory is less than a third threshold, reclaiming, by the flash memory controller, a loss page generated when the fast programming page is allocated for the target synchronous write request.

According to a second aspect, a mobile terminal for processing a write request is provided, where the mobile terminal includes: a processor, configured to: determine, by using an input/output IO scheduler, that current IO scheduling is in a blocked state, where the blocked state includes a state in which a time of processing an IO request by the IO scheduler is greater than a first preset threshold; select a target synchronous write request from to-be-processed IO requests, where the target synchronous write request is used to write data into a flash memory of the mobile terminal; and add an acceleration flag to the target synchronous write request, where the acceleration flag is used to instruct a flash memory controller to perform acceleration processing on the target synchronous write request by using idle space of the flash memory; and the flash memory controller, configured to: after receiving, from the processor, the target synchronous write request including the acceleration flag, determine a size of the idle space of the flash memory; and when the size of the idle space of the flash memory is greater than a second preset threshold, perform acceleration processing on the target synchronous write request by using the idle space of the flash memory.

With reference to the second aspect, in a first possible implementation of the second aspect, the processor is specifically configured to: select a foremost synchronous write request from an IO request queue by using the IO scheduler, and determine that the foremost synchronous write request is the target synchronous write request.

With reference to the second aspect or the first possible implementation of the second aspect, in a second possible implementation of the second aspect, the processor is specifically configured to: determine a quantity of the to-be-processed IO requests in the IO request queue by using the IO scheduler; and when the quantity of the to-be-processed IO requests is greater than a first threshold, determine that the current IO scheduling is in the blocked state.

With reference to the second aspect or the first possible implementation of the second aspect, in a third possible implementation of the second aspect, the processor is specifically configured to: determine, by using the IO scheduler, a processing time of a write request or read request that is currently being processed; and when the processing time is greater than a second threshold, determine that the current IO scheduling is in the blocked state.

With reference to any one of the second aspect or the first to the third possible implementations of the second aspect, in a fourth possible implementation of the second aspect, the flash memory controller is specifically configured to: allocate a fast programming page for the target synchronous write request, and perform acceleration processing on the target synchronous write request by using the fast programming page.

With reference to the fourth possible implementation of the second aspect, in a fifth possible implementation of the second aspect, the flash memory controller is specifically configured to: determine the size of the idle space of the flash memory after performing acceleration processing on the target synchronous write request by using the idle space of the flash memory; and when the size of the idle space of the flash memory is less than a third threshold, reclaim a loss page generated when the fast programming page is allocated for the target synchronous write request.

In the embodiments of this application, an IO scheduler in a mobile terminal selects a target synchronous write request from to-be-processed IO requests after determining that current IO scheduling is in a blocked state, and adds an acceleration flag to the target synchronous write request, so that after receiving the target synchronous write request including the acceleration flag, and determining that a size of idle space of a flash memory is greater than a second preset threshold, a flash memory controller performs acceleration processing on the target synchronous write request.

This can reduce a possibility of system stalling resulting from processing of a synchronous request in the mobile terminal.

DESCRIPTION OF EMBODIMENTS

The following describes the technical solutions in the embodiments of this application with reference to the accompanying drawings in the embodiments of this application.

It should be understood that a method for processing a write request in the embodiments of this application may be applied to a mobile terminal (Mobile Terminal). The mobile terminal may be referred to as a terminal (Terminal), a mobile station (Mobile Station, "MS" for short), user equipment (User Equipment, "UE" for short), or the like. The mobile terminal may communicate with one or more core networks via a radio access network (Radio Access Network, "RAN" for short). For example, the mobile terminal may be a mobile phone (or referred to as a "cellular" phone). For example, the mobile terminal may also be a portable, pocket-sized, handheld, computer built-in, or in-vehicle mobile apparatus.

Figure 1:
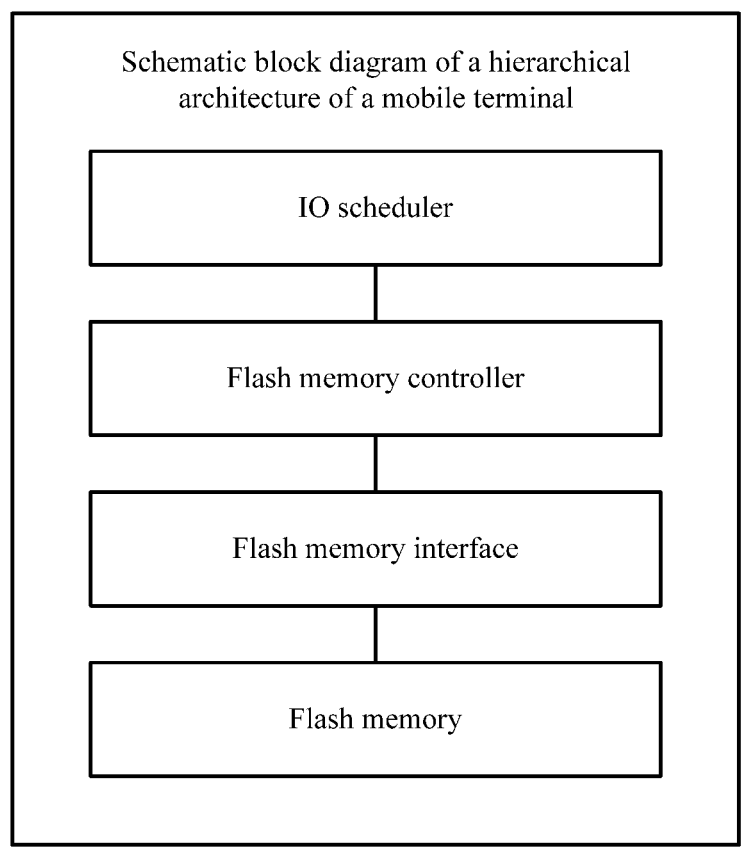
FIG. 1 is a schematic structural diagram of a mobile terminal according to an embodiment of this application.

It should be understood that a mobile terminal in the embodiments of this application may include a host, a flash memory, and a flash memory controller. The host reads data from and writes data into the flash memory by using the flash memory controller. For example, FIG. 1 shows a schematic structural diagram of a mobile terminal according to an embodiment of this application. As shown in FIG. 1, an IO scheduler in a host can control read/write operations on a flash memory by using a flash memory controller. The IO scheduler may be connected to the flash memory controller by using an interface, and the flash memory controller may be connected to the flash memory by using a flash memory interface, to control the flash memory.

It should be understood that a flash memory in the embodiments of this application may be a flash memory chip in an embedded multimedia card (Embedded Multi Media Card, eMMC) storage device, and a flash memory controller may be an eMMC controller in the eMMC storage device. The flash memory may also be another storage device based on a flash memory, and the flash memory controller may also be another controller that is capable of controlling read/write operations on the flash memory. In the embodiments of this application, no specific limitation is imposed thereon.

Figure 2:
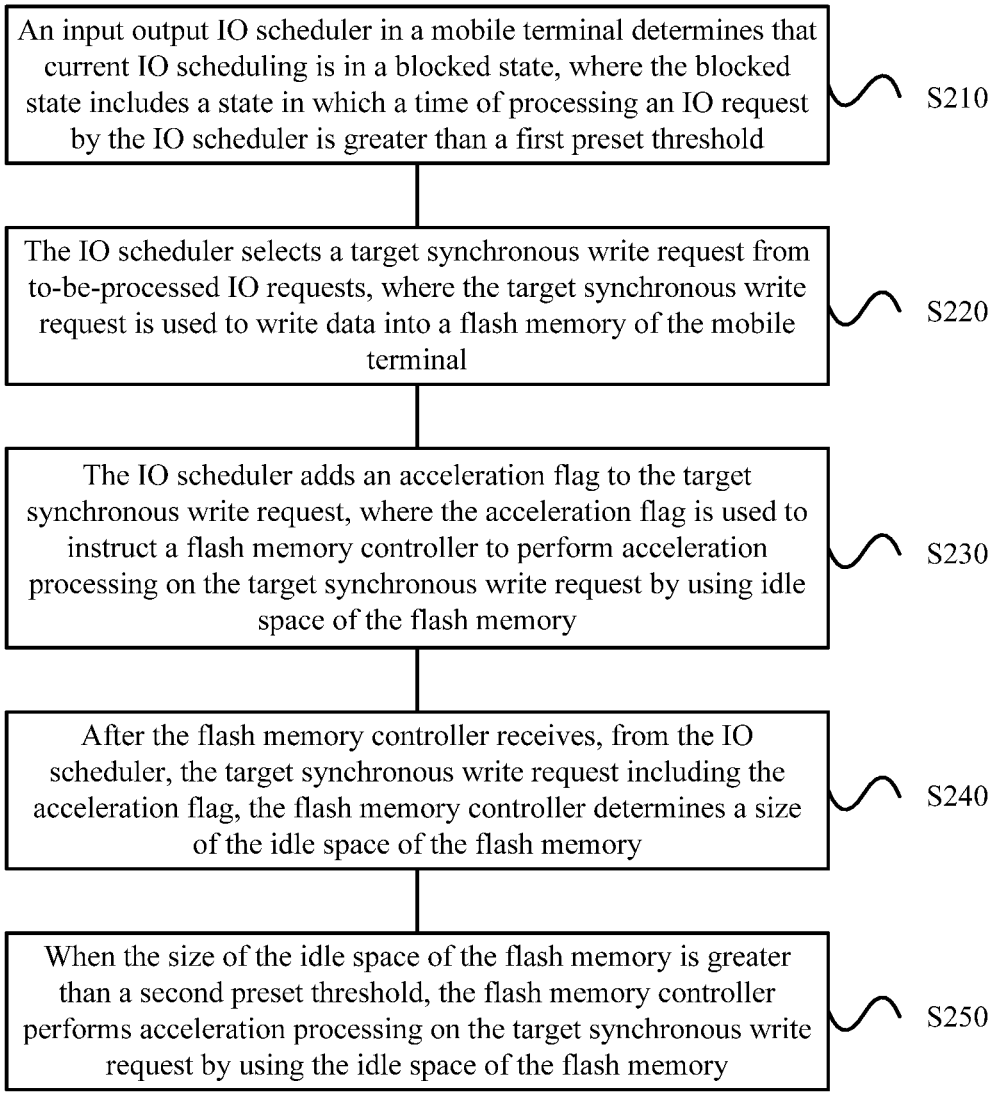
FIG. 2 is a schematic flowchart of a method for processing a write request according to an embodiment of this application.

FIG. 2 shows a schematic flowchart of a method 200 for processing a write request according to an embodiment of this application. As shown in FIG. 2, the method 200 includes the following steps:

S210. An IO scheduler in a mobile terminal determines that current IO scheduling is in a blocked state, where the blocked state includes a state in which a time of processing an IO request by the IO scheduler is greater than a first preset threshold.

S220. The IO scheduler selects a target synchronous write request from to-be-processed IO requests, where the target synchronous write request is used to write data into a flash memory of the mobile terminal.

S230. The IO scheduler adds an acceleration flag to the target synchronous write request, where the acceleration flag is used to instruct a flash memory controller to perform acceleration processing on the target synchronous write request by using idle space of the flash memory.

S240. After the flash memory controller receives, from the IO scheduler, the target synchronous write request including the acceleration flag, the flash memory controller determines a size of the idle space of the flash memory.

S250. When the size of the idle space of the flash memory is greater than a second preset threshold, the flash memory controller performs acceleration processing on the target synchronous write request by using the idle space of the flash memory.

In this embodiment of this application, an IO scheduler in a mobile terminal selects a target synchronous write request from to-be-processed IO requests after determining that current IO scheduling is in a blocked state, and adds an acceleration flag to the target synchronous write request, so that after receiving the target synchronous write request including the acceleration flag, and determining that a size of idle space of a flash memory is greater than a second preset threshold, a flash memory controller performs acceleration processing on the target synchronous write request. This can reduce a possibility of system stalling resulting from processing of a synchronous request in the mobile terminal.

It should be understood that, in this embodiment of this application, the time of processing the IO request by the IO scheduler may include a time used by the IO scheduler from generating the IO request (including a read request and a write request) to processing the IO request and returning a confirmation value to a system. Alternatively, the time of processing the IO request may include a waiting time in which the IO request waits for being processed or an execution time of executing the IO request. In addition, the processing the IO request may include a process in which the IO request is written into or read from the flash memory according to the IO request.

It should be understood that the blocked state in this embodiment of this application may mean that a processing time of an IO request currently being processed by the IO scheduler exceeds the first preset threshold, or may mean that a time of processing all IO requests in an IO request queue by the IO scheduler exceeds the first preset threshold. Alternatively, the blocked state may include a case in which a waiting time of a to-be-processed IO request in the IO scheduler exceeds the first preset threshold. In this embodiment of this application, a value of the first preset threshold is not specifically limited, and may be determined according to a processing capability of the IO scheduler during an actual operation, or may be determined according to experience.

It should be understood that a method used by the IO scheduler to determine that the current IO scheduling is in the blocked state is not limited in this embodiment of this application. The method may be first determining that a time of processing an IO request by a current IO scheduler exceeds a threshold, and then determining that current IO scheduling is in a blocked state. Alternatively, the method may be first determining that a quantity of to-be-processed IO requests in a current IO scheduler exceeds a given quantity, and then determining that current IO scheduling is in a blocked state. Alternatively, another method defined by a person skilled in the art to determine that IO scheduling is in a blocked state may be included.

Optionally, selecting the target synchronous write request from the IO requests may be selecting one or more synchronous write requests from the to-be-processed IO requests. The selecting, by the IO scheduler, a target synchronous write request from to-be-processed IO requests may be understood as: selecting, by the IO scheduler, at least one synchronous write request from synchronous write requests in the to-be-processed IO requests, and determining that the at least one synchronous write request is the target synchronous write request. The at least one target synchronous write request may be one or more of the to-be-processed synchronous write requests, or may be all of the to-be-processed synchronous write requests.

Optionally, a method for adding the acceleration flag by the IO scheduler is not limited in this embodiment of this application. For example, the IO scheduler may add a flag bit to a synchronous write request, and the flag bit may be one bit or several bits. After determining the target synchronous write request, the IO scheduler may place the acceleration flag in the flag bit of the target synchronous write request. Alternatively, the adding a flag bit to a synchronous write request may be understood as adding an acceleration flag bit parameter to a data parameter corresponding to the synchronous write request. After the synchronous write request is determined as the target synchronous write request, the acceleration flag bit parameter may be set to a predefined value. For example, when the flag bit is one bit, a symbol of the flag bit may be set to 1, representing that acceleration processing is performed on the target synchronous write request.

Optionally, in an embodiment, after receiving the target synchronous write request from the IO scheduler, the flash memory controller may determine whether the target synchronous write request includes the acceleration flag. For example, the flash memory controller is an eMMC controller, and a function of the eMMC controller in the prior art may be extended, so that the eMMC controller can identify the target synchronous write request added with the acceleration flag in the IO scheduler. If the eMMC controller determines that a received synchronous write request does not include the acceleration flag, the synchronous write request may be processed in an ordinary manner. Optionally, after receiving the target synchronous write request, the eMMC controller may determine the target synchronous write request according to the acceleration flag, and then determine the size of the idle space of the flash memory, so as to determine whether to perform acceleration processing on the target synchronous write request. If the size of the idle space of the flash memory is greater than the second preset threshold, acceleration processing is performed on the target synchronous write request. If the size of the idle space of the flash memory is less than the second preset threshold, the target synchronous write request may be processed in an ordinary manner.

It should be understood that when the flash memory controller performs acceleration processing on the target synchronous write request, space of the flash memory is wasted to some extent. That is, compared with the ordinary processing manner, more space is occupied when the flash memory controller performs acceleration processing on the target synchronous write request. Therefore, in this embodiment of this application, when receiving the target synchronous write request including the acceleration flag, the flash memory controller may determine whether a size of current idle space allows acceleration processing. When the size of the idle space is greater than the second preset threshold, it indicates that the size of the idle space allows acceleration processing. When the size of the idle space is less than the second preset threshold, it indicates that the size of the idle space does not allow acceleration processing. It should be understood that the second preset threshold may be set, provided that data reading and writing in the flash memory are not affected. For example, the second preset threshold may be set to be slightly greater than a garbage reclaiming threshold of the flash memory.

It should be understood that a specific method for performing acceleration processing on the target synchronous write request by the flash memory controller is not limited in this embodiment of this application. For example, an acceleration method in the prior art may be used to perform acceleration processing on the target synchronous write request.

Optionally, in an embodiment, in the method 200 for processing a write request in this embodiment of this application, the selecting, by the IO scheduler, a target synchronous write request from to-be-processed IO requests includes: selecting, by the IO scheduler, a foremost synchronous write request from the IO request queue; and determining, by the IO scheduler, that the foremost synchronous write request is the target synchronous write request.

It should be understood that a method for selecting the target synchronous write request by the IO scheduler is not limited in this embodiment of this application. For example, the IO scheduler may traverse the IO request queue by using a traversing method, select the foremost synchronous write request from the IO request queue, and determine that the foremost synchronous write request is the target synchronous write request.

It should be understood that the IO scheduler usually processes IO requests in the IO request queue sequentially from front to back. In other words, an IO request in the front of the IO request queue is processed earlier. When IO scheduling is in the blocked state, the foremost synchronous write request in the IO request queue is selected as the target synchronous write request, and the acceleration flag is added to the target synchronous write request. The target synchronous write request in the front can be sent to the flash memory controller earlier by the IO scheduler than a synchronous write request in the back, so that the flash memory controller performs acceleration processing. This can further relieve an IO blocked state within a shorter time, and reduce a possibility of system stalling.

Optionally, in an embodiment, in the method 200 for processing a write request in this embodiment of this application, the determining, by an IO scheduler in a mobile terminal, that current IO scheduling is in a blocked state includes: determining, by the IO scheduler, a quantity of the to-be-processed IO requests in the IO request queue; and when the quantity of the to-be-processed IO requests is greater than a first threshold, determining, by the IO scheduler, that the current IO scheduling is in the blocked state.

It should be understood that, in this embodiment of this application, when there are many to-be-processed IO requests in the IO request queue, it means that the to-be-processed IO requests in the IO request queue need to wait for a long time before being written into the flash memory. Therefore, it can be determined that a current IO scheduler is in the blocked state. It should be understood that a setting of the first threshold is not specifically limited. For example, the first threshold may be set according to a current system requirement, or may be set according to experience.

Optionally, in an embodiment, in the method 200 for processing a write request in this embodiment of this application, the determining, by an IO scheduler in a mobile terminal, that current IO scheduling is in a blocked state includes: determining, by the IO scheduler, a processing time of a write request or read request that is currently being processed; and when the processing time is greater than a second threshold, determining, by the IO scheduler, that the current IO scheduling is in the blocked state.

It should be understood that, in this embodiment of this application, a current IO request processing capability of the IO scheduler may be learned according to a processing time of an IO request currently being processed by the IO scheduler, to further determine whether a current IO scheduler is in the blocked state. A write request in this embodiment of this application may include a synchronous write request, or may include an asynchronous write request. It should be understood that all read requests generated by the IO scheduler in the mobile terminal in a process of a read/write operation belong to synchronous requests. A setting of the second threshold is not specifically limited in this embodiment of this application. For example, the second threshold may be set according to a current system requirement, or may be set according to experience.

Optionally, in an embodiment, in the method 200 for processing a write request in this embodiment of this application, the performing, by the flash memory controller, acceleration processing on the target synchronous write request by using the idle space of the flash memory includes: allocating, by the flash memory controller, a fast programming page for the target synchronous write request; and performing, by the flash memory controller, acceleration processing on the target synchronous write request by using the fast programming page.

It should be understood that a specific method for performing acceleration processing by the flash memory controller by using the fast programming page is not limited in this embodiment of this application. For example, the flash memory is a multiple level cell (Multiple Level Cell, MLC) flash memory. Each storage unit in the MLC flash memory can program two bits, namely, a most significant bit (Most Significant Bit, MSB) and a least significant bit (Least Significant, LSB). Correspondingly, an MSB page and an LSB page exist in the MLC flash memory. The MSB page includes MSBs only, and the LSB page includes LSBs only. In a programming process, a programming speed of the MSB page is higher than that of the LSB page. When the fast programming page is allocated for the target synchronous write request, writing data into the MSB page only and skipping the LSB page may be set, thereby increasing a speed of processing the target synchronous write request by the flash memory controller.

Optionally, in an embodiment, the method 200 for processing a write request in this embodiment of this application further includes: after the flash memory controller performs acceleration processing on the target synchronous write request by using the idle space of the flash memory, determining the size of the idle space of the flash memory; and when the size of the idle space of the flash memory is less than a third threshold, reclaiming, by the flash memory controller, a loss page generated when the fast programming page is allocated for the target synchronous write request.

It should be understood that a setting of the third threshold is not specifically limited in this embodiment of this application. The third threshold may be the garbage reclaiming threshold of the flash memory. When the idle space of the flash memory is less than the garbage reclaiming threshold, the flash memory controller needs to clean up and reclaim the space of the flash memory, so as to reclaim the loss page generated when the fast programming page is allocated for the target synchronous write request.

For example, in the previous example, when the MLC flash memory performs acceleration processing on the target synchronous write request, no data is written into the LSB page in the flash memory, but the LSB page occupies storage space of the flash memory. The LSB page is the loss page generated when the fast programming page is allocated for the target synchronous write request. The loss page is reclaimed preferentially. This can reduce space waste of the flash memory in a timely manner and improve space utilization of the flash memory. For example, the flash memory controller is an eMMC controller. A function mechanism of the eMMC controller may be set, and the loss page is set as an invalid page. In this way, a loss page generated during acceleration processing may be reclaimed in a garbage reclaiming process, to improve the space utilization of the flash memory.

The foregoing details specific embodiments of the method for processing a write request in the embodiments of this application with reference to FIG. 1 and FIG. 2. The following details a mobile terminal for processing a write request in the embodiments of this application with reference to FIG. 3 and FIG. 4.

Figure 3:
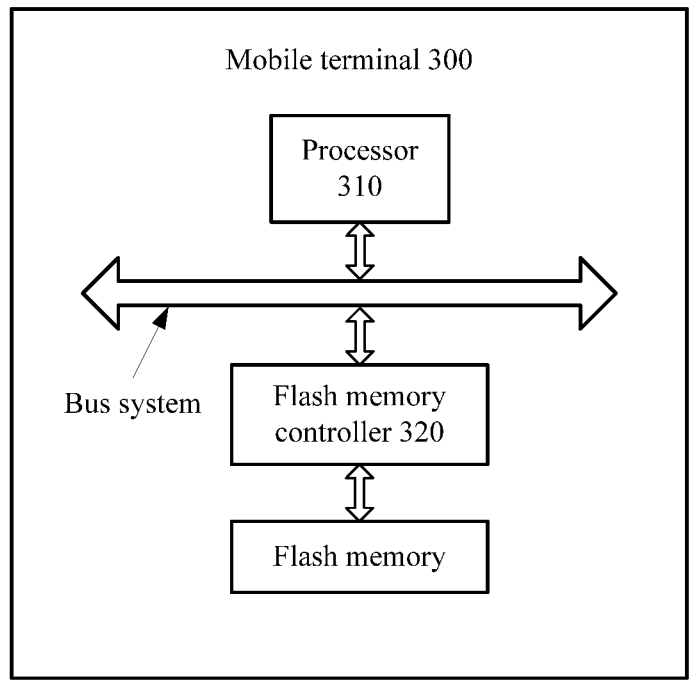
FIG. 3 is a schematic diagram of a mobile terminal 300 for processing a write request according to an embodiment of this application.

FIG. 3 shows a schematic diagram of a mobile terminal 300 for processing a write request according to an embodiment of this application. It should be understood that the following and other operations and/or functions of various modules in the mobile terminal 300 in this embodiment of this application aim to implement corresponding processes of methods in FIG. 2. For brevity, details are not described herein again. As shown in FIG. 3, the mobile terminal 300 includes:

a processor 310, configured to: determine, by using an IO scheduler, that current IO scheduling is in a blocked state, where the blocked state includes a state in which a time of processing an IO request by the IO scheduler is greater than a first preset threshold; select a target synchronous write request from to-be-processed IO requests, where the target synchronous write request is used to write data into a flash memory of the mobile terminal; and add an acceleration flag to the target synchronous write request, where the acceleration flag is used to instruct a flash memory controller to perform acceleration processing on the target synchronous write request by using idle space of the flash memory; and the flash memory controller 320, configured to: after receiving, from the processor, the target synchronous write request including the acceleration flag, determine a size of the idle space of the flash memory; and when the size of the idle space of the flash memory is greater than a second preset threshold, perform acceleration processing on the target synchronous write request by using the idle space of the flash memory.

In this embodiment of this application, a processor in a mobile terminal selects a target synchronous write request from to-be-processed IO requests after determining, by using an IO scheduler, that current IO scheduling is in a blocked state, and adds an acceleration flag to the target synchronous write request, so that after receiving the target synchronous write request including the acceleration flag, and determining that a size of idle space of a flash memory is greater than a second preset threshold, a flash memory controller performs acceleration processing on the target synchronous write request. This can reduce a possibility of system stalling resulting from processing of a synchronous request in the mobile terminal.

As shown in FIG. 3, the processor 310 and the flash memory controller 320 may be connected by using a bus system.

It should be understood that, in this embodiment of this application, the processor 310 may be a central processing unit (Central Processing Unit, CPU), or the processor 310 may be any other general-purpose processor, a digital signal processor (Digital Signal Processor, DSP), an application specific integrated circuit (Application Specific Integrated Circuit, ASIC), a field programmable gate array (Field Programmable Gate Array, FPGA), any other programmable logic device, a discrete gate or transistor logic device, a discrete hardware component, or the like. The general-purpose processor may be a microprocessor, or the processor may be any conventional processor or the like.

Optionally, in an embodiment, the processor 310 is specifically configured to: select a foremost synchronous write request from an IO request queue by using the IO scheduler, and determine that the foremost synchronous write request is the target synchronous write request.

Optionally, in an embodiment, the processor 310 is specifically configured to: determine a quantity of the to-be-processed IO requests in the IO request queue by using the IO scheduler; and when the quantity of the to-be-processed IO requests is greater than a first threshold, determine that the current IO scheduling is in the blocked state.

Optionally, in an embodiment, the processor 310 is specifically configured to: determine, by using the IO scheduler, a processing time of a write request or read request that is currently being processed; and when the processing time is greater than a second threshold, determine that the current IO scheduling is in the blocked state.

Optionally, in an embodiment, the flash memory controller 320 is specifically configured to: allocate a fast programming page for the target synchronous write request, and perform acceleration processing on the target synchronous write request by using the fast programming page.

Optionally, in an embodiment, the flash memory controller 320 is specifically configured to: determine the size of the idle space of the flash memory after performing acceleration processing on the target synchronous write request by using the idle space of the flash memory; and when the size of the idle space of the flash memory is less than a third threshold, reclaim a loss page generated when the fast programming page is allocated for the target synchronous write request.

Figure 4:
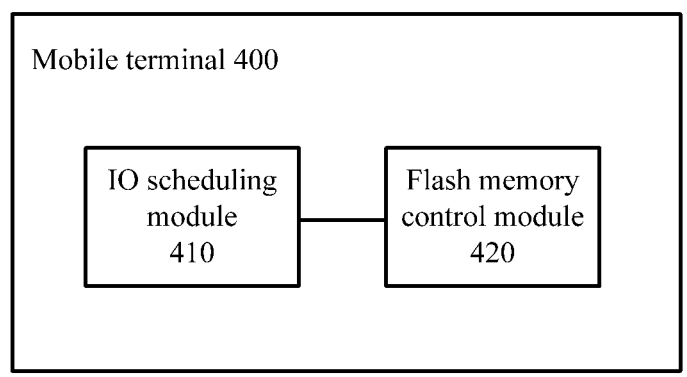
FIG. 4 is a schematic diagram of a mobile terminal 400 for processing a write request according to an embodiment of this application.

FIG. 4 shows a schematic diagram of a mobile terminal 400 for processing a write request according to an embodiment of this application. The mobile terminal 400 may be an apparatus for processing a write request. It should be understood that the following and other operations and/or functions of various modules in the mobile terminal 400 in this embodiment of this application aim to implement corresponding processes of various methods in FIG. 2. For brevity, details are not described herein again. The mobile terminal 400 may be a mobile terminal. As shown in FIG. 4, the mobile terminal 400 includes:

an IO scheduling module 410, configured to: determine that current IO scheduling is in a blocked state, where the blocked state includes a state in which a time of processing an IO request by the IO scheduler module is greater than a first preset threshold; select a target synchronous write request from to-be-processed IO requests, where the target synchronous write request is used to write data into a flash memory of the mobile terminal; and add an acceleration flag to the target synchronous write request, where the acceleration flag is used to instruct a flash memory controller module to perform acceleration processing on the target synchronous write request by using idle space of the flash memory; and the flash memory control module 420, configured to: after receiving, from the IO schedule module, the target synchronous write request including the acceleration flag, determine a size of the idle space of the flash memory; and when the size of the idle space of the flash memory is greater than a second preset threshold, perform acceleration processing on the target synchronous write request by using the idle space of the flash memory.

In this embodiment of this application, an IO scheduling module in a mobile terminal selects a target synchronous write request from to-be-processed IO requests after determining that current IO scheduling is in a blocked state, and adds an acceleration flag to the target synchronous write request, so that after receiving the target synchronous write request including the acceleration flag, and determining that a size of idle space of a flash memory is greater than a second preset threshold, a flash memory control module performs acceleration processing on the target synchronous write request. This can reduce a possibility of system stalling resulting from processing of a synchronous request in the mobile terminal.

Optionally, in an embodiment, the IO scheduling module 410 is specifically configured to: select a foremost synchronous write request from an IO request queue, and determine that the foremost synchronous write request is the target synchronous write request.

Optionally, in an embodiment, the IO scheduling module 410 is specifically configured to: determine a quantity of the to-be-processed IO requests in the IO request queue; and when the quantity of the to-be-processed IO requests is greater than a first threshold, determine that the current IO scheduling is in the blocked state.

Optionally, in an embodiment, the IO scheduling module 410 is specifically configured to: determine a processing time of a write request or read request that is currently being processed; and when the processing time is greater than a second threshold, determine that the current IO scheduling is in the blocked state.

Optionally, in an embodiment, the flash memory control module 420 is specifically configured to: allocate a fast programming page for the target synchronous write request, and perform acceleration processing on the target synchronous write request by using the fast programming page.

Optionally, in an embodiment, the flash memory control module 420 is specifically configured to: determine the size of the idle space of the flash memory after performing acceleration processing on the target synchronous write request by using the idle space of the flash memory; and when the size of the idle space of the flash memory is less than a third threshold, reclaim a loss page generated when the fast programming page is allocated for the target synchronous write request.

It should be understood that sequence numbers of the foregoing processes do not mean execution sequences in various embodiments of this application. The execution sequences of the processes should be determined according to functions and internal logic of the processes, and should not be construed as any limitation on the implementation processes of the embodiments of this application.

A person of ordinary skill in the art may be aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, mobile terminal, and method may be implemented in other manners. For example, the described mobile terminal embodiment is merely an example. For example, the unit division is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the mobile terminals or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments in this application.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the prior art, or all or a part of the technical solutions may be implemented in the form of a software product. The computer software product is stored in a storage medium and includes several instructions for instructing a computer device (which may be a personal computer, a server, a network device, or the like) to perform all or a part of the steps of the methods described in the embodiments of this application. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

To make this application document concise and clear, it may be understood that technical features and descriptions of an embodiment may be applied to other embodiments and are not described again in the other embodiments.

The foregoing descriptions are merely specific implementations of this application, but are not intended to limit the protection scope of this application. Any modification or replacement readily figured out by a person skilled in the art within the technical scope disclosed in this application shall fall within the protection scope of this application. Therefore, the protection scope of the present application shall be subject to the protection scope of the claims.

What is claimed is:

1. A method for processing a write request, comprising:
   determining, by an input/output (IO) scheduler in a mobile terminal, that current IO scheduling is in a blocked state, wherein the blocked state comprises a state in which a time of processing an IO request by the IO scheduler is greater than a first preset threshold;
   selecting, by the IO scheduler, a target synchronous write request from to-be-processed IO requests, wherein the target synchronous write request is used to write data into a flash memory of the mobile terminal;
   adding, by the IO scheduler, an acceleration flag to the target synchronous write request, wherein the acceleration flag is used to instruct a flash memory controller to perform acceleration processing on the target synchronous write request by using idle space of the flash memory;
   after the flash memory controller receives, from the IO scheduler, the target synchronous write request comprising the acceleration flag, determining, by the flash memory controller, a size of the idle space of the flash memory; and
   when the size of the idle space of the flash memory is greater than a second preset threshold, performing, by the flash memory controller, acceleration processing on the target synchronous write request by using the idle space of the flash memory.

2. The method according to claim 1, wherein the selecting, by the IO scheduler, a target synchronous write request from to-be-processed IO requests comprises:
   selecting, by the IO scheduler, a foremost synchronous write request from an IO request queue; and
   determining, by the IO scheduler, that the foremost synchronous write request is the target synchronous write request.

3. The method according to claim 1, wherein the determining, by an IO scheduler in a mobile terminal, that current IO scheduling is in a blocked state comprises:
   determining, by the IO scheduler, a quantity of the to-be-processed IO requests in the IO request queue; and
   when the quantity of the to-be-processed IO requests is greater than a first threshold, determining, by the IO scheduler, that the current IO scheduling is in the blocked state.

4. The method according to claim 1, wherein the determining, by an IO scheduler in a mobile terminal, that current IO scheduling is in a blocked state comprises:
   determining, by the IO scheduler, a processing time of a write request or read request that is currently being processed; and
   when the processing time is greater than a second threshold, determining, by the IO scheduler, that the current IO scheduling is in the blocked state.

5. The method according to claim 1, wherein the performing, by the flash memory controller, acceleration processing on the target synchronous write request by using the idle space of the flash memory comprises:
   allocating, by the flash memory controller, a fast programming page for the target synchronous write request; and
   performing, by the flash memory controller, acceleration processing on the target synchronous write request by using the fast programming page.

6. The method according to claim 5, wherein the method further comprises:
   after the flash memory controller performs acceleration processing on the target synchronous write request by using the idle space of the flash memory, determining the size of the idle space of the flash memory; and
   when the size of the idle space of the flash memory is less than a third threshold, reclaiming, by the flash memory controller, a loss page generated when the fast programming is allocated for the target synchronous write request.

7. A mobile terminal for processing a write request, comprising:
   a central processing unit (CPU), configured to: determine, by using an input/output IO scheduler, that current IO scheduling is in a blocked state, wherein the blocked state comprises a state in which a time of processing an IO request by the IO scheduler is greater than a first preset threshold; select a target synchronous write request from to-be-processed IO requests, wherein the target synchronous write request is used to write data into a flash memory of the mobile terminal; and add an acceleration flag to the target synchronous write request, wherein the acceleration flag is used to instruct a flash memory controller to perform acceleration processing on the target synchronous write request by using idle space of the flash memory; and
   the flash memory controller, configured to: after receiving, from the CPU, the target synchronous write request comprising the acceleration flag, determine a size of the idle space of the flash memory; and when the size of the idle space of the flash memory is greater than a second preset threshold, perform acceleration processing on the target synchronous write request by using the idle space of the flash memory.

8. The mobile terminal according to claim 7, wherein the CPU is configured to: select a foremost synchronous write request from an IO request queue by using the IO scheduler, and determine that the foremost synchronous write request is the target synchronous write request.

9. The mobile terminal according to claim 7, wherein the CPU is configured to: determine a quantity of the to-be-processed IO requests in the IO request queue by using the IO scheduler; and when the quantity of the to-be-processed IO requests is greater than a first threshold, determine that the current IO scheduling is in the blocked state.

10. The mobile terminal according to claim 7, wherein the CPU is configured to: determine, by using the IO scheduler, a processing time of a write request or read request that is currently being processed; and when the processing time is greater than a second threshold, determine that the current IO scheduling is in the blocked state.

11. The mobile terminal according to claim 7, wherein the flash memory controller is configured to: allocate a fast programming page for the target synchronous write request, and perform acceleration processing on the target synchronous write request by using the fast programming page.

12. The mobile terminal according to claim 11, wherein the flash memory controller is configured to: determine the size of the idle space of the flash memory after performing acceleration processing on the target synchronous write request by using the idle space of the flash memory; and when the size of the idle space of the flash memory is less than a third threshold, reclaim a loss page generated when the fast programming page is allocated for the target synchronous write request.

\* \* \* \* \*